United States Patent
Fuma et al.

(10) Patent No.: US 11,104,288 B2
(45) Date of Patent: Aug. 31, 2021

(54) SIDE AIRBAG APPARATUS

(71) Applicant: Autoliv Development AB, Vargarda (SE)

(72) Inventors: Makoto Fuma, Kanagawa (JP); Yuto Kobayashi, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 105 days.

(21) Appl. No.: 16/615,008

(22) PCT Filed: Apr. 17, 2018

(86) PCT No.: PCT/JP2018/015829
§ 371 (c)(1),
(2) Date: Nov. 19, 2019

(87) PCT Pub. No.: WO2018/211894
PCT Pub. Date: Nov. 22, 2018

(65) Prior Publication Data
US 2020/0180540 A1 Jun. 11, 2020

(30) Foreign Application Priority Data
May 19, 2017 (JP) .............................. JP2017-100010

(51) Int. Cl.
*B60R 21/207* (2006.01)
*B60R 21/231* (2011.01)
(Continued)

(52) U.S. Cl.
CPC .......... *B60R 21/207* (2013.01); *B60R 21/233* (2013.01); *B60R 21/23138* (2013.01);
(Continued)

(58) Field of Classification Search
CPC ..... B60R 21/231; B60R 21/26; B60R 21/207; B60R 21/23138
See application file for complete search history.

(56) References Cited

U.S. PATENT DOCUMENTS 6,270,113 B1 8/2001 Wipasuramonton et al.
7,431,329 B2 * 10/2008 Taguchi ............ B60R 21/23138
280/729
(Continued)

FOREIGN PATENT DOCUMENTS

JP H10-100827 A 4/1998
JP 2003-501303 A 1/2003
(Continued)

OTHER PUBLICATIONS

International Search Report of the International Searching Authority for PCT/JP2018/015829 dated Jun. 5, 2018. [See English Machine Translation].

*Primary Examiner* — Karen Beck
(74) *Attorney, Agent, or Firm* — Stephen T. Olson; Harness, Dickey & Pierce, P.L.C.

(57) ABSTRACT

Objective: To provide a side airbag apparatus that can protect a head portion and chest portion by an appropriate restraining force, while favorably inflating and expanding even a cushion that protects a head portion and chest portion with a small inflator, and that can ensure high OOP performance.

Resolution Means: A configuration of a side airbag apparatus 100 according to the present invention includes: a bag-like cushion 110; an inflator 150; a first demarcating part 130*a* that demarcates the cushion 110 into a first chamber 132 on a vehicle rearward side and a second chamber 134 on a vehicle forward side, a second demarcating part 130*b* that demarcates a third chamber 136 on an upper side of the first chamber 132 and second chamber 134

(Continued)

of the cushion 110, a first inner vent 142 disposed above the first demarcating part 130, and a second inner vent 144 disposed above the second demarcating part 130b, which flows a gas flowing into the second chamber into the third chamber, and which is provided with a check valve structure that prevents a reverse flow of the gas.

8 Claims, 2 Drawing Sheets

(51) Int. Cl.
  *B60R 21/26* (2011.01)
  *B60R 21/233* (2006.01)
  *B60R 21/00* (2006.01)
(52) U.S. Cl.
  CPC ...... *B60R 21/26* (2013.01); *B60R 2021/0044* (2013.01); *B60R 2021/0048* (2013.01); *B60R 2021/0058* (2013.01); *B60R 2021/23146* (2013.01); *B60R 2021/23161* (2013.01); *B60R 2021/23324* (2013.01)

(56) References Cited

U.S. PATENT DOCUMENTS

| | | | |
|---|---|---|---|
| 7,770,921 B2* | 8/2010 | Mueller | B60R 21/2346 280/739 |
| 8,657,330 B1* | 2/2014 | Choi | B60R 21/23138 280/730.2 |
| 9,580,039 B2 | 2/2017 | Schneider et al. | |
| 10,124,759 B2 | 11/2018 | Smith et al. | |
| 2006/0001244 A1* | 1/2006 | Taguchi | B60R 21/23138 280/729 |
| 2006/0202450 A1 | 9/2006 | Madasamy et al. | |
| 2007/0267854 A1* | 11/2007 | Fukuda | B60R 21/23138 280/730.2 |
| 2008/0203711 A1* | 8/2008 | Shimono | B60R 21/2346 280/730.2 |
| 2012/0181780 A1* | 7/2012 | Rickenbach | B60R 21/2346 280/730.2 |
| 2015/0115583 A1 | 4/2015 | Azuma et al. | |
| 2015/0183393 A1 | 7/2015 | Kino et al. | |
| 2015/0239423 A1* | 8/2015 | Hayashi | B60R 21/2338 280/729 |
| 2016/0101758 A1 | 4/2016 | Fujiwara | |
| 2016/0159310 A1* | 6/2016 | Kobayashi | B60R 21/26 280/729 |

FOREIGN PATENT DOCUMENTS

| | | |
|---|---|---|
| JP | 2006-008017 A | 1/2006 |
| JP | 2013-233863 A | 11/2013 |
| JP | 2015-143086 A | 8/2015 |
| JP | 2016-078507 A | 5/2016 |
| JP | 2016-203878 A | 12/2016 |
| WO | 2015/020052 A1 | 2/2015 |
| WO | WO-2016152245 A1 * | 9/2016 ........ B60R 21/239 |

\* cited by examiner

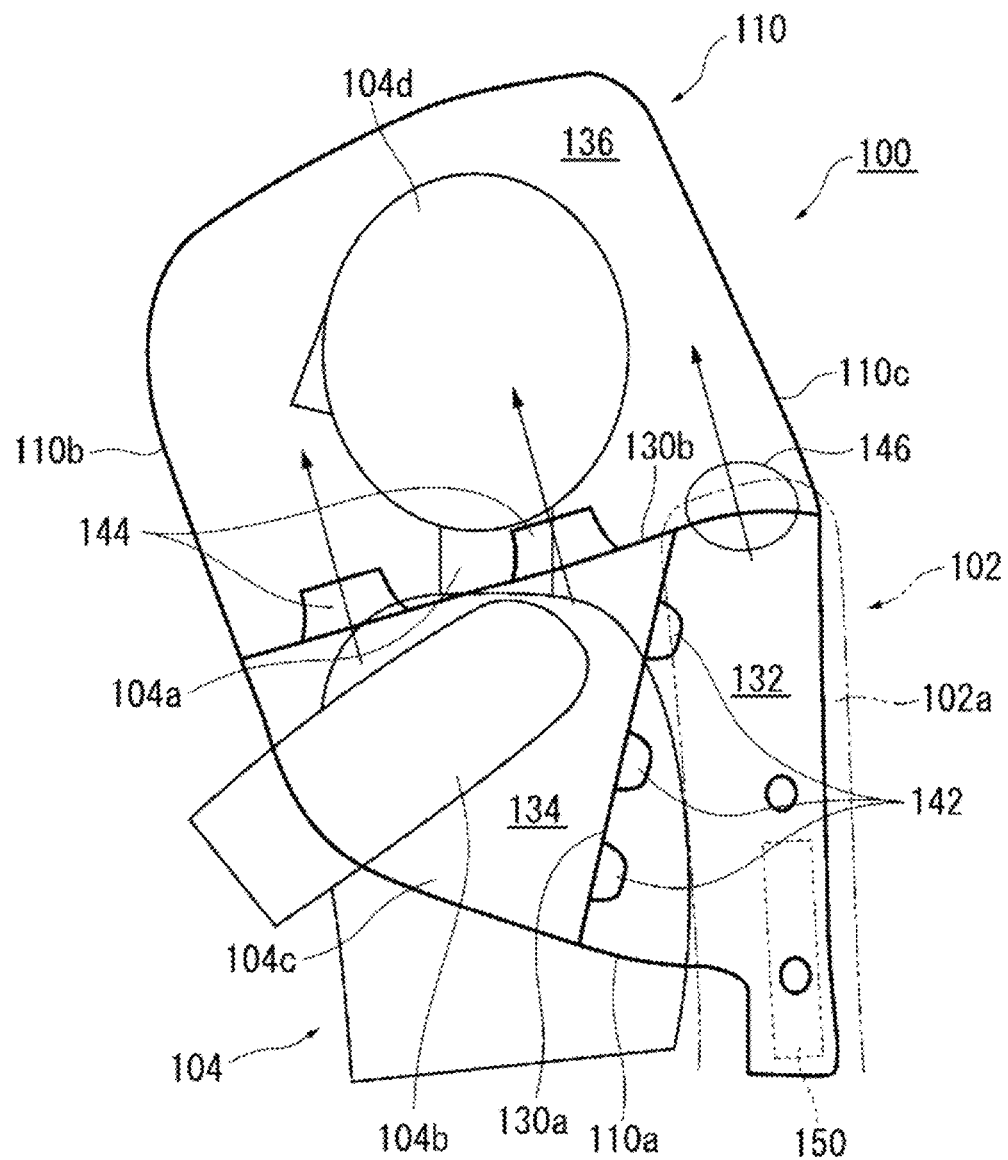
[FIG. 1]

[FIGS. 2]
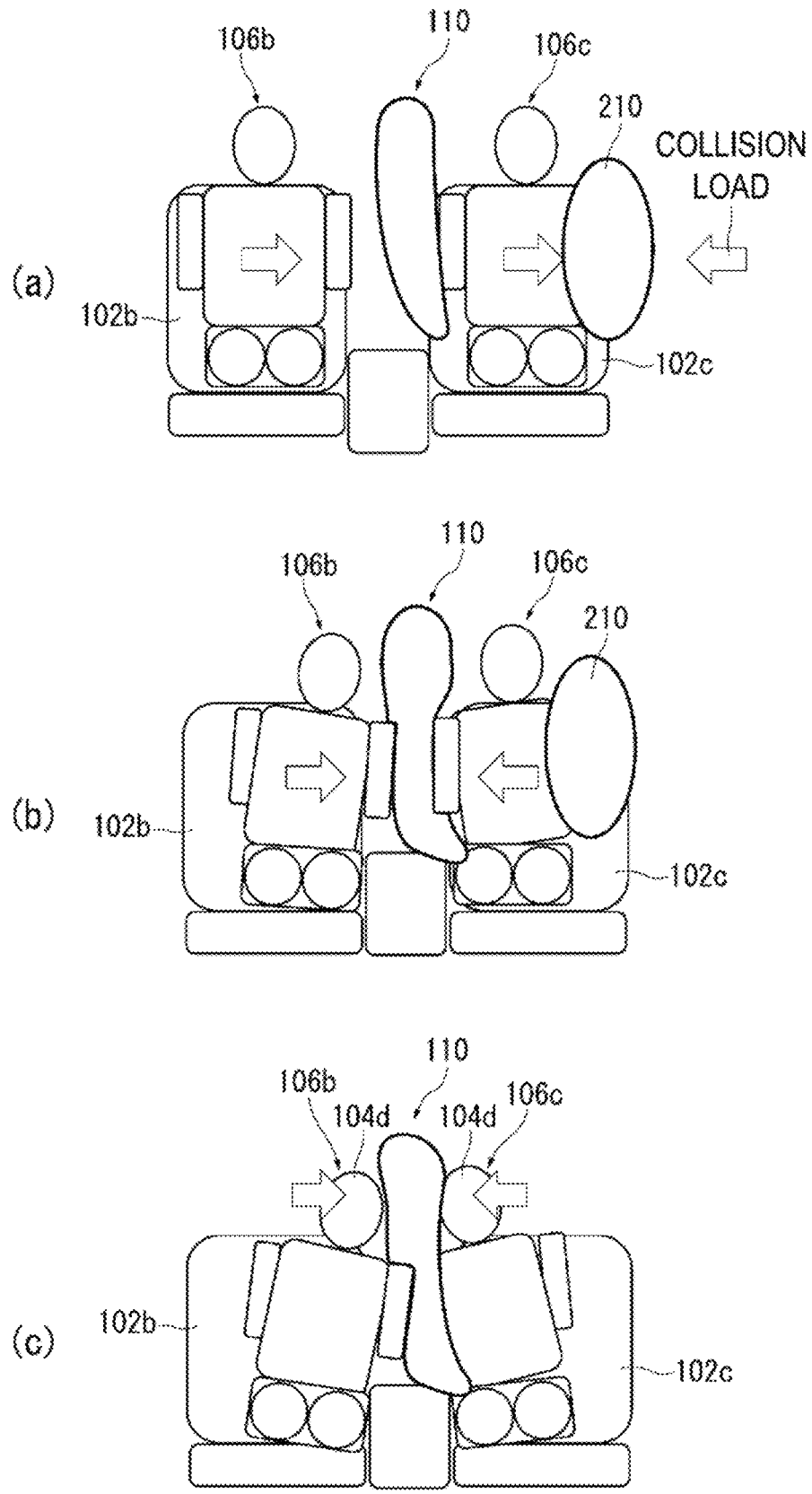

SIDE AIRBAG APPARATUS

TECHNICAL FIELD

The present invention relates to a side airbag apparatus that inflates and expands upward from a side surface of a vehicle seat.

BACKGROUND

Airbags are standard equipment in almost all recent vehicles. A side airbag apparatus is a safety apparatus which is operated in case of an emergency such as a vehicle collision and, for example, includes a bag shaped cushion. There are various types of airbags depending on an installation point and application. One example thereof is a side airbag apparatus that inflates and expands right by a side of an occupant from a side surface of a seat in order to protect the occupant from a side-impact collision or subsequent rollover.

For example, Patent Document 1 discloses a side airbag apparatus that is expanded between a side surface of a vehicle interior and an occupant. In the side airbag apparatus of Patent Document 1, an airbag is configured from a chest portion inflating chamber corresponding to a chest portion of an occupant and a head portion inflating chamber corresponding to a head portion of the occupant. As is also described in Patent Document 1, the side airbag apparatus that protects both the head portion and chest portion of the occupant has a large airbag volume. Therefore, time is required until complete inflation and expansion, and thus a large inflator having a long gas generating time must be adopted.

Therefore, in Patent Document 1, expansion in a direction where inner surfaces of the airbag separate from each other is limited by a limiting part. As a result, the airbag volume when inflated is suppressed, and therefore, the size of the inflator can be reduced. Additionally, in Patent Document 1, expansion in a direction where inner surfaces of the airbag separate from each other is limited by making the limiting part to have a curved shape relative to the flow direction of the gas flowing from the head portion inflating chamber to the chest portion inflating chamber. Based thereon, it is said that damage of the limiting part due to gas pressure during inflation and expansion can be suppressed, and thus the reliability of the airbag can be improved.

RELATED ART DOCUMENTS

Patent Documents

[Patent Document 1] JP 10-175497 A

SUMMARY OF THE INVENTION

Problem to be Solved by the Invention

With the side airbag apparatus of Patent Document 1, a limiting part is provided between the chest portion inflating chamber and head portion inflating chamber, however, the chest portion inflating chamber and head portion inflating chamber are connected. Therefore, internal pressures of the chest portion inflating chamber and head portion inflating chamber when an airbag inflates and expands are essentially the same. Thereupon, restraining forces in a region restraining a head portion and region restraining a chest portion cannot be individually adjusted.

Furthermore, the airbag apparatus is designed such that a maximum performance can be demonstrated when an occupant is in a normal occupant posture (regular seating posture) in the event of a collision. However, there is demand for the airbag apparatus to not provide an excessive impact even when the occupant is in an irregular seating posture). Therefore, an OOP (Out Of Position) test, which confirms that there is no hazardability in an irregular seating posture, in other words, OOP performance, is performed for airbag apparatuses. However, with the side airbag apparatus of Patent Document 1, no consideration is given for OOP performance, and there is room for further improvement.

SUMMARY OF THE INVENTION

Problem to be Solved by the Invention

In view of the foregoing, an object of the present invention is to provide a side airbag apparatus which can protect a head portion and chest portion by an appropriate restraining force while favorably inflating and expanding even a cushion that protects a head portion and chest portion with a small inflator, and which can ensure high OOP performance.

Means for Solving the Problem

In order to solve the aforementioned problem, a representative configuration of a side airbag apparatus according to the present invention is a side airbag apparatus that inflates and expands upward from a side surface of a vehicle seat. The side airbag apparatus contains: a bag-like cushion; an inflator that supplies a gas to the cushion to inflate and expand; a first demarcating part that demarcates the cushion extending upward from a lower edge of the cushion when inflated and expanded into a first chamber on a vehicle rearward side and a second chamber on a vehicle forward side; and a second demarcating part that extends from a front edge to a rear edge of the cushion when inflated and expanded through an upper end of the first demarcating part to demarcate a third chamber on an upper side of the first chamber and second chamber. The first chamber is internally provided in the inflator and has a longitudinal shape in a vertical direction along a side surface of the seat. The side airbag apparatus further contains: a first inner vent disposed above the first demarcating part and that flows the gas supplied from the inflator from the first chamber to the second chamber; and a second inner vent disposed above the second demarcating part, which flows the gas flowing into the second chamber to the third chamber, and which is provided with a check valve structure that prevents reverse flow of the gas from the third chamber to the second chamber.

In the aforementioned configuration, the cushion of the side airbag apparatus is demarcated into three chambers by the first demarcating part and second demarcating part. Of the three chambers, the second chamber restrains a shoulder portion and chest portion of an occupant, and the third chamber restrains a head portion of the occupant. Thereby, the entire upper body of the occupant can be sufficiently protected during a collision. In particular, the second chamber and third chamber are demarcated by the second demarcating part such that internal pressures in the chambers can be appropriately set. Therefore, the head portion and chest portion of the occupant can be protected by an appropriate restraining force.

The first chamber has a longitudinal shape in a vertical direction along a side surface of the seat. Therefore, the first chamber contacts the side surface of the seat during inflation and expansion, however, the first chamber does not contact the occupant. Therefore, even if the occupant is in an irregular seating posture during inflation and expansion, an impact on the occupant can be drastically reduced, and high OOP performance can be secured.

The gas supplied from the inflator during inflation and expansion flows from the first chamber to the second chamber through the first inner vent. The gas supplied to the second chamber flows to the third chamber through the second inner vent. At this time, the second inner vent has a check valve structure such that a reverse flow into the second chamber of the gas flowing into the third chamber is prevented. Therefore, the internal pressure in the third chamber can be kept high, and the restraining force of the head portion of the occupant can be increased.

In this side airbag apparatus, a third inner vent is disposed above the second demarcating part, which flows the gas supplied from the inflator into the third chamber from the first chamber, and which is provided with a check valve structure that prevents reverse flow of the gas from the third chamber to the first chamber.

According to the configuration, the gas can flow in from the first chamber to the third chamber through the third inner vent when the cushion is inflated and expanded. In other words, the gas is supplied to the third chamber without passing through the second chamber. Thereby, the third chamber can be rapidly inflated and expanded, and thus the head portion of the occupant can be quickly restrained. Furthermore, the check valve structure is also provided in the third inner vent, and therefore, a reverse flow of the gas from the third chamber into the first chamber is prevented. Therefore, the head portion and chest portion of the occupant can be protected by an appropriate restraining force.

The cushion may be made to inflate and expand at a seat far side. Thereby, the aforementioned effect can be achieved in a side airbag apparatus that, for example, inflates and expands between a driver's seat and front passenger's seat, in other words, a so-called far side airbag apparatus.

The second chamber is preferably positioned to protect a shoulder portion and chest portion of an occupant, the second demarcating part is preferably positioned at a height corresponding to a neck portion of the occupant, and the third chamber is preferably positioned to protect a head portion of the occupant. Of the three chambers, the second chamber restrains a shoulder portion and chest portion of an occupant, and the third chamber restrains a head portion of the occupant.

Effects of the Invention

In view of the foregoing, an object of the present invention is to provide a side airbag apparatus which can protect a head portion and chest portion by an appropriate restraining force while favorably inflating and expanding even a cushion that protects a head portion and chest portion with a small inflator, and which can ensure high OOP performance.

BRIEF DESCRIPTION OF THE DRAWINGS

FIG. 1 is a view illustrating a side airbag apparatus according to the present embodiment.

FIG. 2 is view describing positional relationship between an occupant and cushion during an inflation collision.

REFERENCE NUMERALS

100 . . . Side airbag apparatus, 102 . . . Seat, 102a . . . Side surface, 102b . . . Driver's seat, 102c . . . Front passenger's seat, 104 . . . Occupant, 104a . . . Neck portion, 104b . . . Shoulder portion, 104c . . . Chest portion, 104d . . . Head portion, 106b . . . Occupant, 106c . . . Occupant, 110 . . . Cushion, 110a . . . Lower edge, 110b . . . Front edge, 110c . . . Rear edge, 130a . . . First demarcating part, 130b . . . Second demarcating part, 132 . . . First chamber, 134 . . . Second chamber, 136 . . . Third chamber, 142 . . . First inner vent, 144 . . . Second inner vent, 146 . . . Third inner vent, 150 . . . Inflator, 210 . . . Cushion

DESCRIPTION OF THE PREFERRED EMBODIMENT

Preferred embodiments according to the present invention will hereinafter be described in detail with reference to the appended drawings. The dimensions, materials, other specific numerical values, etc. indicated in such embodiments are mere exemplifications for ease of understanding of the invention and do not limit the present invention unless otherwise noted. Note that in the present specification and drawings, elements having substantially identical functions and configurations are labeled with identical symbols to omit redundant descriptions along with the illustration of elements not directly related to the present invention.

FIG. 1 is a view illustrating a side airbag apparatus 100 according to the present embodiment. FIG. 2 is view describing positional relationship between an occupant and cushion during an inflation collision. Note that in order to facilitate understanding, an inflator 150 and a seat 102 of a vehicle (not entirely illustrated) are illustrated by imaginary lines.

As illustrated in FIG. 1, a side airbag apparatus 100 of the present embodiment is configured such that a cushion 110 inflates and expands upward from a side surface 102a of a seat 102 of a vehicle. The cushion 110 is a bag-like site that receives an occupant 104 during an emergency such as when an impact occurs on the vehicle or the like. In the present embodiment, as illustrated in FIG. 2, the cushion 110 inflates and expands in a flat shape on a vehicle center side of the seat 102, in other words, a so-called far side.

The cushion 110 is formed to be bag-like by overlaying a plurality of base fabrics and the stitching or adhering. The cushion 110 is stored by being wound or folded into a housing (omitted from the drawings) provided on the side surface 102a of the seat 102. Note that a top of the cushion 110 in a stored condition is covered by a seat cover or the like, and therefore cannot be visually recognized from the outside. Furthermore, when the side airbag apparatus 100 is operated, the cushion 110 cleaves a seat cover or the like and inflates and expands in front of the occupant 104 to restrain the occupant from the side. Thereby, in the event of a side collision of the vehicle, the occupant moving in a center direction of the vehicle is received by the cushion 110.

An inflator 150 is installed along with the cushion 110 on the side surface 102a of the seat 102. The inflator 150 is a gas generating device, which receives an operation signal transmitted from a vehicle side when an impact occurs, and performs inflation and expansion by supplying a gas inside the cushion 110. The inflator 150 used in the present embodiment is a cylinder type, and is installed in the cushion 110 such that a longitudinal direction is included in a vertical direction. The inflator 150 is fastened to the housing or the like of the side surface 102a of the seat 102 with a stud bolt (omitted from the drawings) integrated with a surface and that is exposed from the inside of the cushion 110 to the outside.

Currently popular inflators 150 include: types where a gas generating agent is filled and combusted to generate a gas; types where compressed gas is filled to supply a gas without generating heat; hybrid types using both the combusted gas and compressed gas; and the like. Any type of the inflator 150 can be used.

As illustrated in FIG. 1, the cushion is demarcated into three chambers in the side airbag apparatus 100 of the present embodiment. A first demarcating part 130a extends upward from a lower edge 110a of the cushion 110 when inflated and expanded. The inside of the cushion 110 is demarcated into a first chamber 132 on a vehicle rearward side and a second chamber 134 on a vehicle forward side by the first demarcating part 130a.

A second demarcating part 130b extends through an upper end of the first demarcating part 130a from a front edge 110b to a rear edge 110c of the cushion 110 when inflated and expanded. In the present invention, "occupant" is equivalent to a physique based on World SID established based on human body data of an adult male, for example, an international unified side collision dummy developed under ISO/TC22/SC12/WG5. The second demarcating part is positioned at a height corresponding to a neck portion of the occupant. The inside of the cushion 110 is demarcated into a first chamber 132 on a vehicle rearward side and a second chamber 136 on a vehicle forward side by the first demarcating part 130a.

The first chamber is internally provided in the inflator and has a longitudinal shape in a vertical direction along a side surface of the seat. The second chamber 134 is disposed at a position for protecting a shoulder portion 104b and chest portion 104c of the occupant 104. The second demarcating part 130b is positioned at a height corresponding to the neck portion 104a of the occupant 104, and therefore, the third chamber 136 is disposed at a position for protecting the head portion 104d of the occupant 104.

Based on the configuration, of the three chambers demarcated by the first demarcating part 130a and second demarcating part 130b, the second chamber 134 restrains the shoulder portion 104b and chest portion 104c of the occupant 104, and the third chamber 136 restrains the head portion 104d of the occupant 104. Thereby, the entire upper body of the occupant can be sufficiently protected during a collision.

Meanwhile, the first chamber 132 along the side surface of the seat 102 contacts the side surface 102a of the seat 102, while hardly contacting the occupant 104. In other words, the first chamber 132 functions as an LRD (low risk deployment: for OOP) chamber that does not provide excessive impact on the occupant 104 at an initial stage during inflation and expansion. Therefore, even if the occupant is in an irregular seating posture during inflation and expansion, an impact on the occupant can be drastically reduced, and high OOP performance can be secured.

In particular, the second chamber and third chamber are demarcated by the second demarcating part such that internal pressures in the chambers can be appropriately set. Therefore, the head portion and chest portion of the occupant can be protected by an appropriate restraining force.

Furthermore, the inside of the cushion is demarcated into three chambers by the first demarcating part 130a and second demarcating part 130b, and an inner vent having a check valve structure described later is provided. Therefore, the internal volume of the cushion 110 is reduced as compared to the cushion is not demarcated. Thereby, a large cushion 110 that protects the head portion 104d, shoulder portion 104b, and chest portion 104c of the occupant 104 can also be sufficiently inflated and expanded by the small inflator 150. Therefore, the small inflator 150 can be used in the side airbag apparatus 100, and thus the cost and size of the apparatus can be reduced.

Refer again to FIG. 1. As illustrated in FIG. 1, a first inner vent 142 is disposed above the first demarcating part 130a. Gas supplied from the inflator 150 flows to the second chamber 134 from the first chamber 132 through the first inner vent 142. A second inner vent 144 provided with a check valve structure is disposed above the second demarcating part 130b. Gas supplied from the inflator 150 flows to the second chamber 136 from the first chamber 132 through the first inner vent 144.

Based on the configuration, the gas supplied from the inflator 150 flows through the cushion 110 such that the first chamber 132, second chamber 134, and third chamber 136 are inflated in this order. Thereby, the shoulder portion can be restrained at initial inflation and expansion, and the second inner vent 144 is provided with a check valve structure such that the gas flowing into the third chamber 136 can be prevented from reverse flowing into the second chamber 134. Therefore, the internal pressure in the third chamber can be kept high, and the restraining force of the head portion of the occupant can be increased.

A second inner vent 146 provided with a check valve structure is disposed above the second demarcating part 130b. Gas supplied from the inflator 150 flows to the second chamber 136 from the first chamber 132 through the first inner vent 146. In other words, the gas is supplied to the third chamber without passing through the second chamber. Thereby, the third chamber can be rapidly inflated and expanded, and thus the head portion of the occupant can be quickly restrained.

Furthermore, the first inner vent 142 is provided such that an expanding force of the cushion 110 to the vehicle forward side can be increased. Furthermore, the first inner vent 146 is provided such that an expanding force of the cushion 110 to the vehicle forward side can be increased. Therefore, based on the configuration, the side surface 102a of the seat 102 during inflation and expansion can be cleaved, and the cushion 110 can be efficiently inflated and expanded as a whole.

Furthermore, the check valve structure is also provided in the third inner vent, and therefore, a reverse flow of the gas from the third chamber into the first chamber is prevented. Therefore, the head portion and chest portion of the occupant can be protected by an appropriate restraining force. Note that in the present embodiment, a configuration is exemplified where the third inner vent 146 is provided above the second demarcating part 130b, but is not limited thereto, and a configuration is possible where the third inner vent 146 is not provided.

FIG. 2 is view describing positional relationship between an occupant and cushion during an inflation collision. FIG. 2(a) to (c) illustrates conditions where vehicle seats and occupants seated therein are viewed from the front. Note that in FIG. 2(a) to (c), only the cushion 110, which is observable in appearance, of the side airbag apparatus 100 is illustrated. Furthermore, for convenience of describing, a seat on a left side of the drawing of the two seats disposed side-by-side is referred to as a driver's seat 102*b*, and a seat on a right side of the drawing is referred to a front passenger's seat 102*c*.

As illustrated in FIG. 2(*a*), when a collision load is applied on the front passenger's seat 102*c* of the vehicle due to a side collision of the vehicle, the cushion 110 cleaves the side surface 102*a* (refer to FIG. 1) on a far side of the front passenger's seat 102*c*, and the cushion 110 begins to inflate and expand. At this time, a cushion 210 of another side airbag apparatus expands on a near side of the front passenger's seat 102*c* of an occupant 106*c* such that the occupant 106*c* of the front passenger's seat 102*c* is pushed toward a center side in a vehicle width direction.

As illustrated in FIG. 2(*b*), when the cushion 110 inflates and expands, an upper body (shoulder portion 104*b* and chest 104*c*) of the occupant of the front passenger's seat 102*c* moving toward the center side in the vehicle width direction by the cushion 110 on the near side is restrained by the cushion 110. At this time, an upper body (shoulder portion 104*b* and chest portion 104*c*) of the occupant 106*b* of the driver's seat 102*b* pushed to the center side in the vehicle width direction by the collision load is also restrained by the cushion 110.

Thereafter, as illustrated in FIG. 2(*c*), the head portions 104*d* of the occupants 106*b*/106*c* of the driver's seat 102*b* and front passenger's seat 102*c* are restrained by the cushion 110. At this time, as illustrated in FIG. 2(*b*), the upper bodies of the occupant 106*b* of the driver's seat 102*b* and occupant 106*c* of the front passenger's seat 102 are restrained such that flow of the gas in the second chamber 134 to the third chamber 136 is promoted. Therefore, the restraining force of the head portion 104*d* by the cushion 110 (strictly, the third chamber 136) can be increased while absorbing energy near the shoulder portions of the occupants 106*b*/106*c*. Therefore, a high restraining force can be secured by the small inflator 150 even in the side airbag apparatus 100 that restrains both an upper body and head portion of an occupant.

Note that in the embodiment described above, the side airbag apparatus 100 where the cushion 110 inflates and expands at a far side of the seat 102, in other words, a so-called far side airbag was exemplified, but the present invention is not limited thereto. The present invention can be applied in a side airbag apparatus where the cushion 110 inflates from a near side on a side surface on an opposite side of the seat 102.

Furthermore, in FIG. 2, a case where occupants are seated in both the driver's seat 102*b* and front passenger's seat 102*c* was exemplified and described, but the present invention is not limited thereto. For example, if an occupant is only seated in the driver's seat 102*b*, the head portion and upper body of the occupant 106*b* in the driver's seat 102*b* can be suitably restrained by the side airbag apparatus of the present embodiment.

A preferred example of the present invention was described above while referring the accompanying drawings. However, the embodiment described above is a preferred example of the present invention, and other embodiments may be implemented or performed by various methods. In particular, unless described otherwise in the specification of the present application, the invention is not restricted to a shape, a size, configurational disposition, and the like of parts illustrated in detail in the accompanying drawings. Furthermore, expressions and terms used in the specification of the present application are used for providing the description, and thus the invention is not limited thereto, unless particularly described otherwise.

Therefore, it is obvious that a person with ordinary skill in the art can conceive various changed examples or modified examples within a scope described in the scope of the claims, which is understood to naturally belong to the technical scope of the present invention.

INDUSTRIAL APPLICABILITY

The present invention relates to a side airbag apparatus that inflates and expands upward from a side surface of a vehicle seat.

The invention claimed is:

1. A side airbag apparatus that inflates and expands upward from a side surface of a vehicle seat,
the side airbag apparatus comprising:
a bag-shaped cushion;
an inflator that supplies a gas to the cushion to inflate and expand;
a first demarcating part that demarcates the cushion extending upward from a lower edge of the cushion when inflated and expanded into a first chamber on a vehicle rearward side and a second chamber on a vehicle forward side; and
a second demarcating part that extends from a front edge to a rear edge of the cushion when inflated and expanded through an upper end of the first demarcating part to demarcate a third chamber on an upper side of the first chamber and second chamber;
the first chamber being internally provided in the inflator and having a longitudinal shape in a vertical direction along a side surface of the seat; and
the side airbag apparatus further comprising:
a first inner vent disposed above the first demarcating part and that flows the gas supplied from the inflator from the first chamber to the second chamber; and
a second inner vent disposed above the second demarcating part, which flows the gas flowing into the second chamber to the third chamber, and which is provided with a check valve structure that prevents reverse flow of the gas from the third chamber to the second chamber.

2. The airbag apparatus according to claim 1, further comprising a second inner vent disposed above the second demarcating part, which flows the gas flowing into the second chamber to the third chamber, and which is provided with a check valve structure that prevents reverse flow of the gas from the third chamber to the second chamber.

3. The airbag apparatus according to claim 1 or 2, wherein the cushion inflates and expands at a seat far side.

4. The airbag apparatus according to claim 2, wherein the cushion inflates and expands at a seat far side.

5. The side airbag apparatus according to claim 1, wherein:
the second chamber is positioned to protect a shoulder portion and chest portion of an occupant,
the second demarcating part is positioned at a height corresponding to a neck portion of the occupant, and
the third chamber is positioned to protect a head portion of the occupant.

6. The side airbag apparatus according to claim 2, wherein:
the second chamber is positioned to protect a shoulder portion and chest portion of an occupant,
the second demarcating part is positioned at a height corresponding to a neck portion of the occupant, and
the third chamber is positioned to protect a head portion of the occupant.

7. The side airbag apparatus according to claim 3, wherein:
- the second chamber is positioned to protect a shoulder portion and chest portion of an occupant,
- the second demarcating part is positioned at a height corresponding to a neck portion of the occupant, and
- the third chamber is positioned to protect a head portion of the occupant.

8. The side airbag apparatus according to claim 4, wherein:
- the second chamber is positioned to protect a shoulder portion and chest portion of an occupant,
- the second demarcating part is positioned at a height corresponding to a neck portion of the occupant, and
- the third chamber is positioned to protect a head portion of the occupant.

\* \* \* \* \*